Patented Nov. 8, 1949

2,487,050

UNITED STATES PATENT OFFICE 2,487,050

HYDROGENATION OF THIOPHENE COMPOUNDS

Stanton A. Harris, Westfield, Karl Folkers, Plainfield, Ralph Mozingo, Elizabeth, and Glen E. Arth, Rahway, N. J., assignors to Merck & Co., Inc., Rahway, N. J., a corporation of New Jersey No Drawing. Application September 16, 1944, Serial No. 554,455

12 Claims. (Cl. 260—329)

1

This invention is concerned generally with novel chemical compounds and processes of preparing the same; more particularly it relates to novel compounds useful as intermediates in synthesis of the growth-promoting factor, biotin.

Biotin is known to be one of the isomers of the chemical compound 2-(4'-carboxy-butyl)-3:4-ureido-tetrahydro-thiophene, having the empirical formula $C_{10}H_{16}O_3N_2S$, and the structural formula:

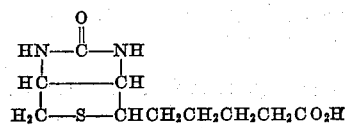

It is now found that this compound can be synthesized by reactions indicated as follows:

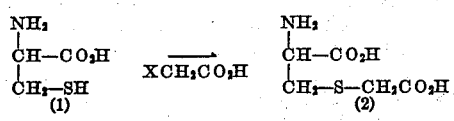

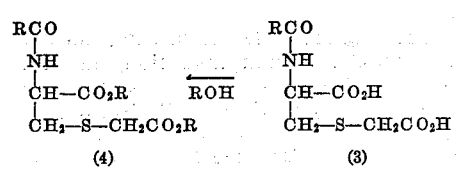

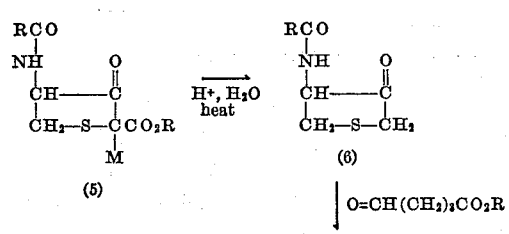

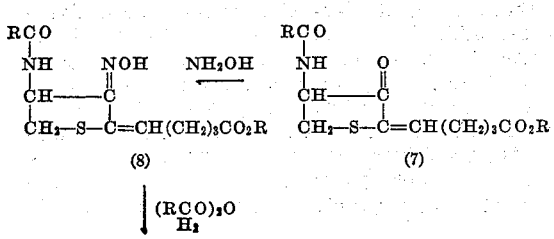

In the above formulae, R represents an alkyl, aryl or arylalkyl group; X, a halogen; and M an alkali metal or an alkaline earth metal.

The reactions above indicated are conducted as follows: 2-amino-3-mercapto propanoic acid (1) and chloroethanoic acid are condensed in an alkaline aqueous solution to form 2-amino-3-carboxymethylmercapto-propanoic acid (2); which is then treated with an acylating agent, such as an acyl halide, in an aqueous alkaline solution to yield 2-acylamido-3-carboxymethyl-mercapto-propanoic acid (3). This product is esterified using a mineral acid catalyst to produce the diester (4) of the acid (3), and the diester is treated with alkali metal alcoholate or an alkaline earth metal alcoholate to yield the 2-alkali metal or the 2-alkaline earth metal derivative of an ester of 2-carboxy-3-keto-4-acylamido-tetrahydrothiophene (5). This compound, when heated with a dilute mineral acid, is hydrolyzed and decarboxylated to produce 3-keto-4-acylamidotetrahydrothiophene (6) which, when reacted with 4-carboxybutanal ester in a lower aliphatic alcohol reaction medium containing piperidine and a lower aliphatic carboxylic acid, produces 2-(4'-carboalkoxy-butylidene)-3-keto - 4 - acylamido - tetrahydrothiophene (7). This product, when reacted with hydroxylamine yields an ester of the corresponding oxime, 2-(4'-carboxy-butylidene)-3-isonitroso-4- acylamido-tetrahydrothiophene (8) which upon treatment with a mixture of zinc, a lower aliphatic acid and a lower aliphatic acid anhydride, produces an equilibrium mixture of 2-(4'-carboxy-butylidene)-3:4-di(acyl-amido)-tetrahydrothiophene ester (9a) and 2-(4'-carboxy-butyl)-3:4-di(acylamido) - 4:5 - dihydrothiophene ester (9b). This equilibrium mixture, or if preferred, one of the equilibrants, is then treated with hydrogen in the presence of a hydrogenation catalyst to yield 2-(4'-carboxy-butyl)-3 : 4-di(acylamido)-tetrahydrothiophene ester (10). When this last mentioned compound is treated with an aqueous alkaline solution, hydrolysis of the acyl groups occurs, yielding upon acidification, 2-(4'-carboxy-butyl)-3:4-diamino-tetrahydrothiophene (11) which, when reacted with a carbonyl halide, produces the compound 2-(4'-carboxy-butyl)-3:4-ureido-tetrahydrothiophene. This product is obtained as a mixture of stereoisomers, one of which is racemic biotin, from which upon resolution, is obtained the dextrorotatory isomer, biotin.

This invention is concerned generally with compounds of the class of which intermediate 10 above is a member, the 2-(4'-carboxy-butyl)-3:4-di(acylamido)-tetrahydrothiophenes and esters thereof; and particularly with the compounds represented by the formula:

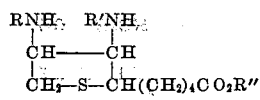

wherein R and R' are different acyl groups and R'' is of the class consisting of hydrogen, alkyl, aryl, and arylalkyl groups.

According to the present invention, compounds represented by this formula are prepared by hydrogenation in the presence of a hydrogenation catalyst, of a compound represented by the formula:

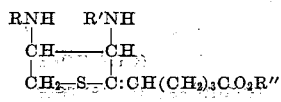

or its equilibrant represented by the formula:

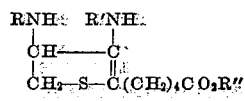

wherein R, R' and R'' have the significance assigned above. It is presently preferred where practicing the process according to this invention to use a hydrogenation catalyst comprising a metal of the platinum group, particularly platinum and/or palladium. It is preferred that the catalyst be distributed upon a suitable carrier such as charcoal suspended in the reaction medium, and that the reaction be conducted in a liquid medium such as an organic solvent.

The starting material can be obtained by the reactions indicated above and described in detail in concurrently filed applications Serial Nos. 554,458 now Patent 2,466,232; 554,449; 554,450; 554,451; 554,452 now Patent 2,452,653; 554,453 now Patent 2,460,224; and 554,454 now Patent 2,459,817; the product obtained by the process according to this invention can be converted to biotin by the operations indicated above and described in concurrently filed applications Serial Nos. 554,456 and 554,457, both now abandoned.

When the compound 2-(4'-carbomethoxy-butylidene) - 3 -acetamido- 4 -benzamido-tetrahydrothiophene is prepared by synthesis, it is obtained as a mixture of isomers which can be readily separated by fractional crystallization, a first racemate of stereo-isomers (M. P. 185–186° C.) consisting of the dextrorotatory and laevorotatory forms of the equilibrant 2-(4'-carbomethoxy-butyl)- 3 -acetamido- 4 -benzamido-4:5-dihydrothiophene and a second racemate of stereoisomers (M. P. 162–163° C.) consisting of the dextrorotatory and laevorotatory forms of 2-(4'-carbomethoxy-butylidene)-3-acetamido- 4 -benzamido - tetrahydrothiophene. The first racemate, when subjected to catalytic hydrogenation according to the process according to this invention, yields a pair of racemic mixtures of stereoisomers, one consisting of dl-trans-allo- 2 -(4'-carbomethoxy-butyl)-3-acetamido-4-benzamido-tetrahydrothiophene (M. P. 172–173° C.) and another dl-cis-2-(4'carbomethoxy-butyl) - 3 -acetamido- 4 -benzamido-tetrahydrothiophene (M. P. 153–4° C.). The second racemate, when subjected to such hydrogenation, also yields a pair of racemic mixtures of stereoisomers, the dl-trans-allo isomer (M. P. 172–173° C.) above mentioned and the dl-trans-epiallo-2-(4'-carbomethoxy-butyl)-3 -acetamido-4-benzamido-tetrahydrothiophene (M. P. 185–6° C.).

Inasmuch as the catalytic reduction reaction according to this invention is not concerned with the acylamido substituents, it is not material what acyl groups appear on these substituents provided however that the acyl groups are different. Among the acyl groups that can appear at these substituents are acetyl, propanoyl, butanoyl, benzoyl and other acyl groups derived from alkyl carboxylic acids, aryl carboxylic acids and arylalkyl carboxylic acids. It is also immaterial what esters are employed as all are satisfactory, including methyl, ethyl, propyl, butyl, benzyl, phenyl and other alkyl, aryl and arylalkyl esters.

The following examples illustrate a method of carrying out the present invention, but it is to be understood that these examples are given by way of illustration and not of limitation.

*Example 1*

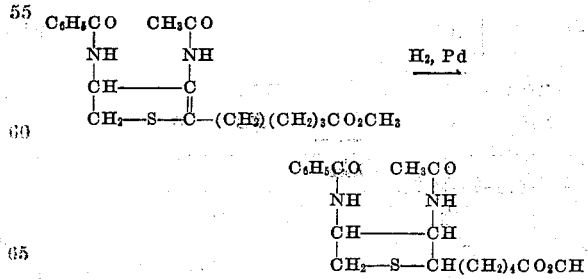

About 1.1 g. of dl-2-(4'-carbomethoxy-butyl)-3-acetamido-4 - benzamido - 4:5 - dihydro - thiophene (M. P. 185–186° C.) is added to a suspension of about 7 g. of palladinized (about 5%) activated charcoal, previously reduced with hydrogen, in about 126 cc. of methanol and hydrogen is passed into the mixture at room temperature. After absorption of the calculated quantity of hydrogen, which usually requires about 20 minutes, the catalyst is removed by filtration and extracted with hot methanol. The extract is evaporated under reduced pressure to yield crude dl-trans-allo-2-(4'-carbomethoxy-butyl)-3-acetamido-4-benzamido-tetrahydrothiophene which when recrystallized from methanol yields the pure product (M. P. 171–172° C.). When this product is saponified by heating with aqueous-alcoholic alkali followed by acidification of the reaction mixture, the corresponding acid, dl-trans-allo-2-(4'-carboxy-butyl)-3-acetamido-4-benzamido-tetrahydrothiophene (M. P. 195° C.) is obtained.

*Example 2*

The operations described in Example 1 are repeated but after the hydrogenation step the catalyst is removed, extracted with chloroform, the extract is evaporated to dryness, and the residue is crystallized from ether to yield the product dl-cis-2-(4'-carbomethoxy-butyl)-3-acetamido-4-benzamido-tetrahydrothiophene (M. P. 153–154° C.). When this product is saponified and acidified as in Example 1, the corresponding dl-cis-acid (M. P. 232° C.) is obtained.

*Example 3*

The operations described in Example 2 are repeated using dl-2-(4'-carbomethoxy-butylidene)-3-acetamido-4-benzamido-tetrahydrothiophene (M. P. 162–163° C.) instead of the starting material therein indicated. The product obtained is dl-trans-epi-allo-2-(4'-carbomethoxy-butyl)-3-acetamido-4-benzamido-tetrahydrothiophene (M. P. 185–186° C.).

*Example 4*

The operations described in Example 1 are repeated using a palladium-barium carbonate catalyst instead of a palladium charcoal catalyst. The product (M. P. 171–172° C.) is identical with that obtained as described in Example 1. Evaporation of the methanol filtrate yields the dl-cis-isomer (M. P. 153–4° C.).

Modifications may be made in carrying out the present invention without departing from the spirit and scope thereof and the invention is to be limited only by the appended claims.

What is claimed is:

1. The process which comprises reacting a compound represented by the formula:

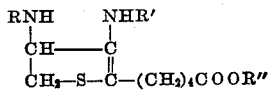

wherein R and R' are different acyl groups and R'' is a radical selected from the group which consists of alkyl, aryl and arylalkyl radicals, with hydrogen in the presence of a hydrogenation catalyst selected from the class which consists of metals of the platinum group, to produce a compound of the formula:

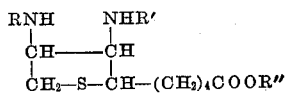

wherein R, R' and R'' have the significance above defined.

2. The process which comprises reacting 2(4'-carboaroxy butyl)-3-acetamido-4-benzamido-4:5-dihydrothiophene with hydrogen in the presence of palladium catalyst to produce 2(4'-carboaroxy butyl)-3-acetamido-4-benzamido tetrahydrothiophene.

3. The process which comprises reacting 2(4'-carboaralkoxy butyl)-3-acetamido-4-benzamido-4:5-dihydrothiophene with hydrogen in the presence of palladium catalyst to produce 2(4'-carboaralkoxy butyl)-3-acetamido-4-benzamido tetrahydrothiophene.

4. The process which comprises reacting 2(4'-carboalkoxy butyl) - 3 - acetamido-4-benzamido-4:5-dihydrothiophene with hydrogen in the presence of palladium to produce 2(4'-carboalkoxy butyl)-3-acetamido-4-benzamido tetrahydrothiophene.

5. The process which comprises reacting 2(4'-carbomethoxy butyl)-3-acetamido-4-benzamido-4:5-dihydrothiophene with hydrogen in the presence of palladium to produce 2(4'-carbomethoxy butyl)-3-acetamido-4-benzamido tetrahydrothiophene.

6. The process which comprises reacting a compound represented by the formula:

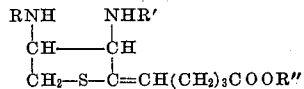

wherein R and R' are different acyl groups and R'' is a radical selected from the group which consists of alkyl, aryl and aryl-alkyl radicals, with hydrogen in the presence of a hydrogenation catalyst selected from the class which consists of metals of the platinum group, to produce a compound of the formula:

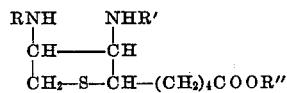

wherein R, R' and R'' have the significance above defined.

7. The process which comprises reacting a compound represented by the formula:

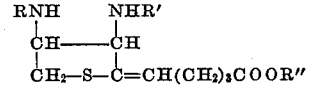

wherein R and R' are different acyl groups and R'' is a radical selected from the group which consists of alkyl, aryl and aryl-alkyl radicals, with hydrogen in the presence of palladium to produce a compound of the formula:

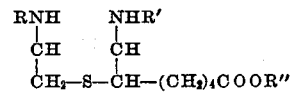

wherein R, R' and R'' have the significance above defined.

8. The process which comprises reacting a compound selected from the class consisting of alkyl, aryl, and aryl-alkyl esters of 2(4'-carboxy-butylidene)-3-acetamido-4 - benzamido tetrahydrothiophene with hydrogen in the presence of a hydrogenation catalyst selected from the class which consists of metals of the platinum group, to produce the corresponding ester of 2(4'-carboxy butyl)-3-acetamido-4-benzamido tetrahydrothiophene.

9. The process which comprises reacting 2(4'-carboalkoxy butylidene)-3-acetamido-4-benzamido tetrahydrothiophene with hydrogen in the presence of palladium to produce 2(4'-carboalkoxy butyl)-3-acetamido-4-benzamido tetrahydrothiophene.

10. The process which comprises reacting 2(4'-carbomethoxybutylidene)-3-acetamido-4-benzamido tetrahydrothiophene with hydrogen in the presence of a hydrogenation catalyst selected from the class which consists of metals of the platinum group, to produce 2(4'-carbomethoxybutyl)-3-acetamido-4-benzamido tetrahydrothiophene.

11. The process which comprises reacting 2(4'-carbomethoxybutylidene)-3-acetamido-4-benzamido tetrahydrothiophene with hydrogen in the presence of palladium to produce 2(4'-carbomethoxybutyl)-3-acetamido-4-benzamido tetrahydrothiophene.

12. The process which comprises reacting a compound selected from the class consisting of compounds having the general formulae:

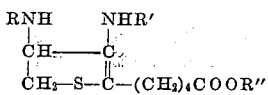

and

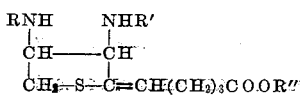

wherein R and R' are different acyl groups and R'' is a radical selected from the class which consists of alkyl, aryl and arylalkyl radicals, with hydrogen in the presence of a hydrogenation catalyst selected from the class which consists of metals of the platinum group, to produce a compound of the formula:

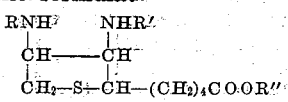

wherein R, R' and R'' have the significance above defined.

STANTON A. HARRIS.
KARL FOLKERS.
RALPH MOZINGO.
GLEN E. ARTH.

REFERENCES CITED

The following references are of record in the file of this patent:

UNITED STATES PATENTS

| Number | Name | Date |
|---|---|---|
| 2,233,999 | Farlow | Mar. 4, 1941 |

OTHER REFERENCES

Berkman: Catalysis, pages 831 and 843, Reinhold Pub. Co., N. Y., 1940.
Richter: Organic Chemistry, pages 649-50, Wiley, N. Y., 1938.
Karrer: Organic Chemistry, page 428, Nordeman, N. Y., 1938.
Morton: The Chemistry of Heterocyclic Compounds, page 7, McGraw-Hill, N. Y., 1946.
Alles: J. Pharm. Exp. Ther., 72, 265 (1941).
Vigneaud: Science, Nov. 20, 1942, page 461.
Cauley: J. Soc. Chem. Ind., 62, 116-119 (1943).